June 21, 1938.  H. S. NEWCOMER  2,121,568

ANAMORPHOSING LIGHT FLUX SYSTEM

Filed Aug. 13, 1935   2 Sheets—Sheet 1

INVENTOR
Harry Sidney Newcomer
BY
ATTORNEY

June 21, 1938.  H. S. NEWCOMER  2,121,568
ANAMORPHOSING LIGHT FLUX SYSTEM
Filed Aug. 13, 1935   2 Sheets—Sheet 2

INVENTOR
Harry Sidney Newcomer
BY
ATTORNEY

Patented June 21, 1938

2,121,568

UNITED STATES PATENT OFFICE 2,121,568

ANAMORPHOSING LIGHT FLUX SYSTEM

Harry Sidney Newcomer, New York, N. Y.

Application August 13, 1935, Serial No. 35,952

19 Claims. (Cl. 88—24)

This invention relates to anamorphosing optical systems and more particularly to systems which produce a unidimensional change in the imagery of a light source. In one aspect it increase the apparent area of the light source, and thereby either increases the light flux, or decreases the light source area necessary to obtain a certain light flux, or both. It has for one of its objects to provide for an increased light flux through a unidimensionally restricted slit, while not interfering with the imagery characteristics of the system of which the slit constitutes a part. In the latter aspect it is in part a continuation of my co-pending application Serial No. 644,993 filed November 30, 1932.

The present invention has made it possible to greatly increase the light flux in sound recording optical systems, and thereby the luminosity of the slit image at the film. Its use is however not limited to this application. It is for instance applicable to increasing the light flux through any unidimensionally restricted aperture where the light source or its equivalent itself is restricted as to its dimensions in the same azimuth. In fact, it is also applicable in the case where the light source is the only one that is restricted as to dimensions.

It has previously been proposed in optical systems for phonographic apparatus, as in Maurer Patent #1,947,565 to produce an attenuated image of a light source of high light efficiency by imaging the light source by means of a system containing a cylindrical element, the image formed by the element being in a plane conjugate to the image on the film. In the present invention this and the disadvantages of such an arrangement are avoided.

The nature and objects of the invention will be better understood from a more detailed description and consideration of the diagram of the accompanying drawings forming a part hereof and in which—

Figure 1 shows diagrammatically the optical system of a sound on film recorder in which a light flux anamorphoser according to the invention is incorporated, and, Fig. 2 is a diagram showing a simple arrangement of a light source, a slit and an objective provided for the purpose of imaging the slit upon a film, and, Fig. 3 is a modification of this simple arrangement of light source slit and objective in which a cylindrical element is introduced, and, Fig. 4 is a modification in which the position or focal length of the cylindrical element is varied, and, Fig. 5 is another variation of the same, and, Fig. 6 is a further variation in which a second cylindrical element of negative power is introduced, and, Fig. 7 shows the relationship between the positive and negative elements of a cylindrical anamorphosing system according to one aspect of the invention, and, Fig. 8 is a further modification thereof, and, Fig. 9 is a modification of the arrangement of the negative cylindrical element thereof.

Figure 1:
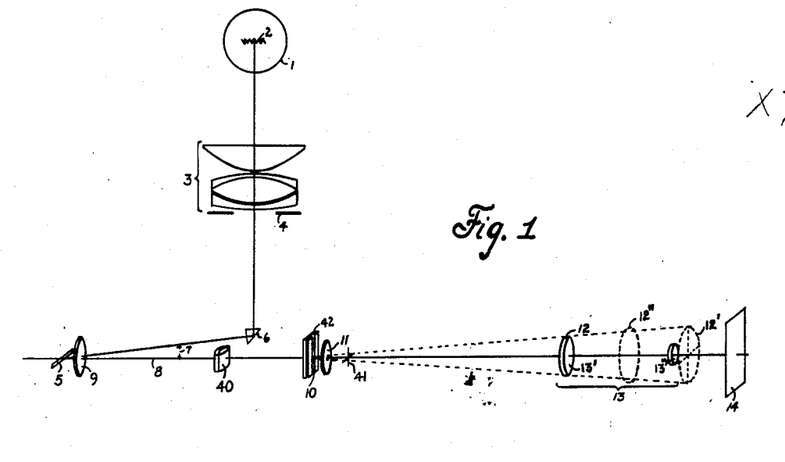

Referring more particularly to the diagrams, and for purposes of clarifying the relationships of the light flux anamorphosing element or elements to a recording system, in Fig. 1, 1 is a lamp bulb with a filament 2, 3 is a condenser imaging the filament through a stop 4 on a galvanometer mirror 5. A prism 6 changes the course of the beam incident upon the mirror so as to provide room for positioning the lamp and condenser in the housing and decreasing the angle 7 between the axis of the illuminating apparatus 1 to 4 and the axis 8 of the recording system proper. The mirror 5 is small and is either cylindrical (concave with axis in the plane in which it swings) or has provided in front of it means 9 for imaging the stop 4 in the slit 10. The mirror has imaged upon it all or a portion of the filament 2, in general the filament being large enough so that its image as made by the condenser 3 is large enough to at least completely cover the mirror. The mirror swings on an axis perpendicular to the slit and thus causes the slit to be traversed in its length by a leading edge, an edge of the stop 4 which is sharply imaged on the slit. The filament image upon the mirror 5 is reimaged by the positive field lens 11, placed close to the slit, in the stop or entrance pupil 12 of the objective 13, which latter is in this case an achromatic microscope objective comprising two elements 13' and 13" of which the mounting of the first constitutes an entrance pupil or stop. The lens 13 images the slit 10 on the film 14. Where, as in this case, the entrance pupil is appreciably spaced from the first principal plane the illumination on the film might be more uniform if the light source were imaged in the first principal plane, situated in this case at 12'. The second principal plane, corresponding to the focal point in 14, is shown at 12", and would be then the position, from the film side of the objective, of the image of the light source.

Whether the mirror be imaged through the slit in 12 or in 12', it is obvious, because of the paraxial character of the imagery in one plane and the existence of the vertical axial stop 10 in the other plane at right angles thereto that the light flux and the utilized portion of the mirror, as conjugate to 12 or 12', are substantially the same. For a more closely spaced objective, or for a simple objective, the stop or entrance pupil, mounting, and principal planes are more nearly together and in the following, for purposes of reference to the light flux relationships in the whole system they and the objective are spoken of interchangeably.

As a result of the arrangement so far described the light flux at the slit image is dependent upon the specific luminosity of the filament, with which we are not here concerned, and granting that the stop 4 is large enough so as not to diaphragm the system, it is limited by the three openings, the mirror (or light source as the mirror may be considered), the slit and the opening of the objective which images the slit on the film. The light source or mirror is either imaged in the objective opening or the conditions as to light flux are such that they may properly be interpreted as if such were the case. In the simple case, before means for increasing light flux are employed, the light source or mirror is relatively the more restricted opening of the two. That is the image of the mirror 5 by the field lens 11 upon the stop 12 is smaller than the stop, and in order that the light flux be maximal it is necessary that this image fully cover the area of the stop. For mechanical reasons the mirror is restricted in its dimension transverse to the axis about which it swings. This limits the light flux in this meridian and in order that the light flux be maximal in the other meridian the mirror must therefore be at least as long, in the axis about which it swings, as is the image of the stop 12 made by the field lens 11 at the mirror 5. For mechanical reasons it is not ordinarily desirable or possible to have the mirror as long as this.

One thus in effect has to do with a light flux system containing two openings unidimensionally restricted in the same meridian. In the subsequent discussion and disclosure of the invention it is immaterial whether the light source be positioned at one of the openings, or imaged in the opening, as for instance, when imaged on a mirror. Nor is it necessary that the light source or its image actually be at the opening. It may be positioned elsewhere and the opening or mirror still function to influence the amount of light flux and the light flux be increased in a manner as subsequently described. Thus the mirror 5 of Fig. 1 constitutes one of the openings limiting the light flux in the system. For simplicity in the following discussion, it is referred to as the "light source" although in the general case it need not be the actual light source and may be nothing more than a restricted opening.

Figure 2:
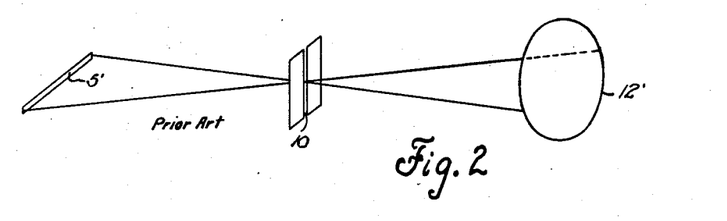

In Fig. 2 there is shown in simple diagrammatical relationship the manner in which the size of the opening or entrance pupil of the objective 12', when projected through the slit 10, controls or determines the most desirable length of the mirror 5' in order that the light flux in the plane transverse to the slit be maximal.

Figure 3:
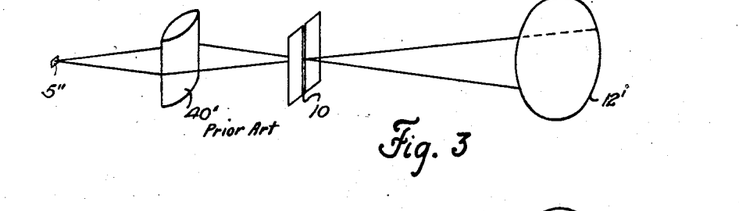

In Fig. 3 is shown a conventional method of increasing the light flux through an objective 12' and through a slit 10 by means of a cylindrical lens 40'. The introduction of the cylindrical lens 40', which images the mirror 5'' in the slit 10, permits the reduction of the length of the mirror to substantially the dimensions of the slit, depending of course upon the relative focal distances to each side of the cylindrical lens.

Figure 4:
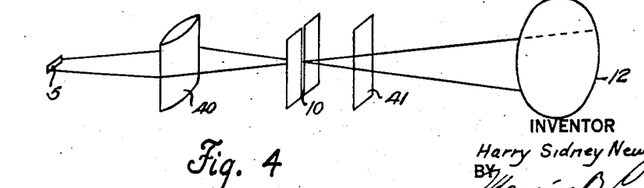
Figure 5:
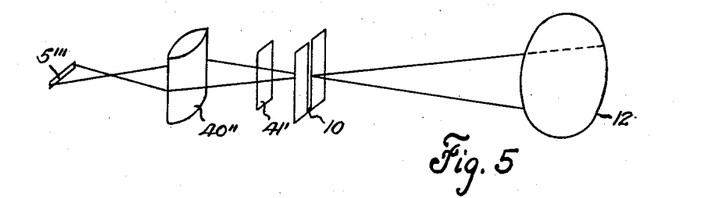

I have discovered that to obtain maximal light flux it is not necessary to, and indeed that there are certain advantages in not focusing the mirror or light source on the slit. Thus in providing a cylindrical lens with its axis parallel to the slit for increasing the light flux it can preferably be so positioned as not to focus the mirror in the slit but in a plane spacially separated therefrom. Such an arrangement is shown in Figs. 4 and 5. In Fig. 4, 12' is the objective, 10 is the slit, 5 is the mirror and 40 is a cylindrical lens imaging the mirror in one azimuth at 41. The size of the mirror image 41, in the azimuth transverse to the axis of the cylindrical lens, is now dependent upon its position with respect to the slit 10 and the objective 12' and the corresponding utilized portion of the mirror is proportionate to this size taking into consideration the focal distances to each side of the lens 40, that is the distances of the mirror 5 and the image 41 from the lens 40. While this increases somewhat the size of the utilized portion of the mirror it has certain advantages particularly in that it avoids imaging the mirror itself upon the slit and therefore it avoids imaging in one azimuth the light distribution on the mirror upon the slit. In the other azimuth the mirror is not imaged by the cylindrical lens and the light flux is limited by the stops of the system as previously described. The lines of Fig. 4 defining the lateral limits of the light flux may be considered as the principal rays of pencils originating in two lateral marginal points of the mirror and focused by the cylindrical lens on its image at the margins thereof. The slit thus acts as a stop for the cylindrical lens and the objective limits the angular opening of the light through this stop.

In Fig. 5 there is shown another modification of the invention. 12' is the objective, 10 is the slit, 5''' is the mirror, 40'' is the cylindrical lens with its axis parallel to the slit, and 41' is the image formed by the cylindrical lens of the mirror, this image lying between the slit and the cylindrical lens. The slit again acts as a stop for the cylindrical lens and the lines are principal rays of marginal pencils originating in the marginal points of the mirror.

Figure 6:
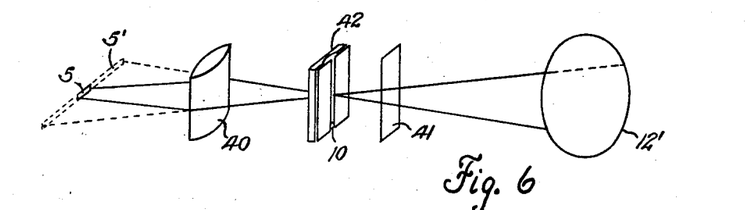

In Fig. 6 there is shown at 12', an objective, and at 5 a mirror, which is imaged by a cylindrical lens 40 whose axis is parallel to a slit 10 and which lens images the mirror 5 at 41 in a plane spacially separated from the slit and lying between the slit and the objective 12'. At 42 there is placed close to the slit a negative cylindrical element with axis parallel to the slit and to the positive element 40. It is of such focal length that one conjugate image is in the plane 41 and the other in the plane of the mirror 5 so that the action of the two elements 40 and 42 together results in forming, at 5, a unidimensionally enlarged image 5' of the mirror. As a result of this device, that is this introduction of the second cylindrical element of negative power, the so-called convergence of light pencils passing through the slit is the same in character as if there were no cylindrical elements present. The anamorphoser is therefore in this sense afocal. That is the pencils traversing the slit appear to originate in a mirror occupying the position of the real mirror but having a length appreciably longer than the portion of the real mirror actually used. This apparent increase in length of the mirror results in an increased light flux through the slit. In the azimuth under consideration, in spite of the introduction of the anamorphosing device to increase the light flux in this azimuth, the light source remains on the mirror and is not transferred to the slit as is the case in the arrangement of Figure 3 and conventional designs of a similar nature.

In Fig. 6 the lines have the same significance as previously except that now the pencils which they represent, instead of being convergent to form an image 41 as they were in Fig. 4 between 10 and 41, are divergent as if originating in points of an imaginary mirror 5'. The image 41 is not formed but is merely shown for constructional purposes to show the relationships between the positive and negative cylindrical elements of the anamorphoser.

Referring back to Fig. 1, the positive cylindrical lens 40 corresponds with the cylindrical element 40 of the Fig. 6. It images the mirror 5 in one azimuth in the plane 41 and the negative cylindrical element 42 with axis parallel to the slit and to the positive cylindrical lens 40 again images the plane 41 in the plane of the mirror 5 thus creating at 5 a unidimensionally enlarged image of the mirror which serves as a source of light for the system and which is imaged by the field lens 11 in the stop 12 of the objective 13, or as above discussed, in the principal plane 12' thereof.

In Figs. 4 and 5 there is no negative cylindrical element placed at the slit but in practice the slit may be so narrow that it in fact serves as a "pin hole" objective, in this case a negative objective, and therefore the arrangement shown in the Figs. 4 and 5 may be substantially that of the arrangement shown in Fig. 6.

That is a pencil through the lens 40 and a slit 10 of Fig. 4 converges to focus in one azimuth in the plane 41. If the slit have a width of only 1 or 2 mills, as is actually the case in practice, and the image distance 10 to 41 is of the order of 160 mills, as it may well be, then the slit 10 so reduces the opening of this pencil that it may for practical purposes be considered as imaged by the slit 10 in the plane 5. This is only possible where the distance 10 to 41 is sufficiently large to make the slit 10 act as a "pin hole" objective.

I have discovered, what at first thought seems improbable, namely, that when the light source, that is in the illustrative example, when the mirror is large enough in itself, or whenever modifications are made as above in Figs. 4, 5, and 6 so as to give an image filling a cone of light through the slit and objective, which ever the case may be, then the light flux is the same no matter which of the means shown diagrammatically in Figs. 2, 3, 4, 5, and 6 are used. In the arrangement shown in Fig. 2 the mirror and/or light source has to be larger than mechanical and electrical conditions make desirable. In the conventional arrangement for avoiding this as shown diagrammatically in Fig. 3, the slit being usually very narrow, one or two mills, the utilized portion of the mirror or light source is correspondingly small, indeed unnecessarily and under certain circumstances undesirably so, as for instance because it might be defective at the small area used.

Also in the conventional arrangement of Fig. 3, the image by the positive cylinder being formed in the slit, the slit cannot act as a "pin hole" negative lens, for to do so it would have to have a zero focal length. This is not true of the improved arrangement shown in Figs. 4 and 5. Also in either of the arrangements shown in Figs. 4 or 5 the necessary length of the mirror or light source to give an image large enough to provide maximum light flux is nevertheless much less than that required in the arrangement of Fig. 2 and well within lengths which are entirely practicable. In fact shorter lengths would not serve any useful purpose or indeed might be difficult to contrive.

Figures 7, 8, 9:
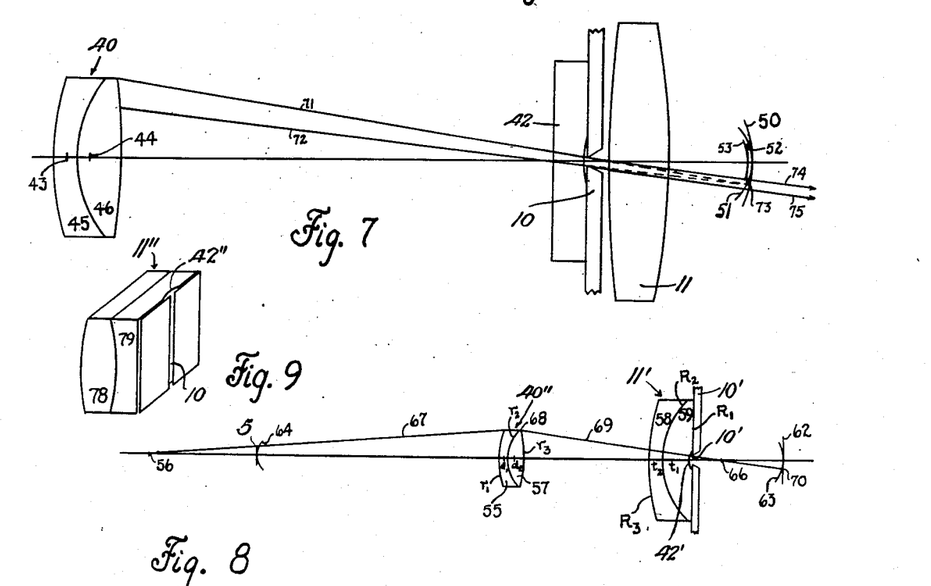

The increase in light flux per unit area of mirror necessary to compensate for the decrease in utilized mirror area, as when a change is made from the arrangement of Fig. 2, and as described above, is made possible by utilizing a larger angular opening of the beam in the azimuth perpendicular to the slit at each point of the mirror, this increased angular opening being provided for by a corresponding increase in the opening of the condenser stop, as at 4, Fig. 1.

Where it is necessary or desirable to have the light flux in the region between the slit and objective strictly homocentric I have discovered this may be accomplished by a certain particular design of the structure of the anamorphosing elements 40 and 42 of which certain characteristics are shown in more detail in Fig. 7.

In Fig. 7 I show at 45 and 46 the two elements of a positive cylindrical lens 40 with axis parallel to a slit 10, and at 42 a simple negative cylindrical element with axis parallel to the slit. At 11 is shown a spherical lens corresponding to the spherical lens 11 of Fig. 1. At 50 and 51 are shown respectively the tangential image surface or the conjugate tangential image surfaces with respect to the mirror as at 5, formed respectively by the positive lens 45, 46 and the negative lens 42.

The spherical field lens 11, which as at 11 of Fig. 1 images the mirror 5 in the stop 12 or principal plane 12' of the objective, should for a number of reasons be a simple lens or at most an achromatized doublet placed close to the slit. One of the reasons for this is that otherwise the slit would be imaged with too much distortion either by the objective 13 or there would be undue distortion of the beam from the mirror defining the leading edge. This means, therefore, that the lens 11, has then an image field concave toward the lens. No matter what lens is used there will be some deviation of its tangential image surface from the focal plane, as described in my copending application Serial No. 644,993 filed Nov. 30, 1932. This can be compensated for by suitable adjustment along oblique rays of the convergence due to the anamorphoser. In order that the aberration of a simple lens or doublet as above described be not increased or exaggerated through the action of the anamorphosing elements, it is necessary that the image of the mirror or filament as formed at 5' by the anamorphosing system 40, 42 be not convex toward the slit but preferably concave toward it. If this were so, then in the plane perpendicular to the slit the curvature of the field of the lens 11 imaging the mirror would be reduced.

The lens 42 is a negative cylindrical element of very short focus. It is shown in as close proximity as possible to the slit 10 and parallel to it. While this is an advantageous arrangement it need not necessarily be placed in this position but could be somewhat spacially separated from the slit. Or, it could be placed on the other side therefore. Because it is cylindrical and because of its shortness of focus it is not easy to make it as a compound lens and its simplest and most convenient form is as a simple negative surface. Such a negative cylindrical lens therefore has a curved tangential image field which is concave towards the lens and is shown in the Fig. 7 at 51.

I have discovered that it is possible to make the mirror image as at 5' concave towards the slit, as described, by making the tangential image field of the cylindrical lens 45, 46 as shown at 50 less concave than that of the negative lens as shown at 51. If such be the case oblique pencils arising in the mirror and passing through the slit appear to come from points on a curved cylindrical surface cutting the axis in the plane of the mirror and concave towards the slit. (See Fig. 8 at 64.)

An opposite convergence effect, if required to neutralize the convergence of a spherical lens having different tangential image field characteristics, might be obtained by making the tangential image field of the positive cylindrical lens more concave than that of the negative cylindrical lens.

In Fig. 7 the lines 71 and 72 indicate marginal rays of a pencil which may be considered as having come from a single marginal point of the mirror. The slit 10 acts as a diaphragm for this pencil and if the cylindrical lens 42 may be considered as centered on the pencil then the pencil is not deviated by the lens. Otherwise the customary deviation would take place. The pencil 71, 72 is focused by the lens 45, 46 upon the surface 50 at the point 73, the lens 42 being considered for the moment as not present. The action of the lens 42, whose image surface 51 contains a point which is conjugate to a point somewhat more proximal than the point of origin of the pencil 71, 72 on the mirror, is to make the beam divergent rather than convergent and appear to come from a point in the neighborhood of the mirror, actually from a point slightly nearer the system than the mirror because of the fact that the surface 51 is more concave than is the surface 50 on which the lens 45, 46 focuses the oblique beam from the mirror. The redirected pencil 71, 72 thus becomes the pencil 74, 75. It has the slit as a stop and the margin of an imaginary curved mirror crossing the axis at the same point as the mirror, as the point of origin.

Since the negative lens 42 is most easily constructed when it is as simple as possible, it is best made non-achromatic, and in order to cut down the color aberration as much as possible is made of a high index low dispersion crown glass. In the illustrative example the lens 42 is made of a glass of index $n_d$ 1.5606 and Abbe number 61.2. For purposes of comparison with other data to be given below its radius may be given as 2.17 m/m. Since it is a simple refracting surface, its tangential image surface as shown at 51 varies in its position according to the color of the light, being nearer the lens and slit for blue than for yellow light. If in Fig. 7 the curve 51 designates the position of the tangential image surface of the negative lens conjugate to the mirror as for the "F" line of spectrum then the position of the tangential image surface for the "g" line of spectrum might be given by the curved line 53.

I have discovered that the color aberration of the lens 42 may be very simply corrected for by under-correcting the color aberration of doublet 45, 46. Since the lens 42 has a much shorter focal length than the lens 45, 46 this under-correction of the lens 45, 46 need only be partial but can easily be made such as to exactly neutralize the color aberration of the lens 42. The cylindrical lens 45, 46 is therefore designed to have a conjugate focus, with respect to the mirror, for the "F" line in the axial point of the surface 51 and for the "g" line in the axial point of the surface 53. Or similarly for any other two spectral points that might suitably be chosen. This under-correction of the lens 45, 46 for color influences the usual conditions obtaining with respect to a spherical correction.

The correction for color may be made by determining the position of the two axial points just described with respect to the axial point of the curved surface of the negative cylindrical lens 42. The distances, then, of these two points from the second principal point, 44, of the lens 45, 46 are the conjugate distances, for the two colors, of the lens 45, 46 with respect to the axial point of the mirror. The reciprocals of these two distances, when each is added to the reciprocal conjugate distance (of the mirror from the first principal point 43 of the lens 45, 46) give a sum equal respectively to the reciprocal focal lengths of the lens 45, 46 needed for the two colors. When the lens 45, 46 is corrected to have such focal lengths for the two colors the system 45, 46, 42 is axially corrected for the said two colors. In other words both the cylindrical lenses, positive and negative, have for each color for which correction is obtained, the same conjugate focal point with respect to the axial point of the mirror. Or in case the imagery after anamorphosis is at infinity, for each color, the conjugate focal point of the mirror with respect to the positive lens is the principal focal point of the negative lens.

I have discovered that if the opening of the lens 45, 46 is not too large, for instance about f/3, and the slit is narrow and centrally placed on the axis, then the correction for marginal rays through the lens 45, 46, that is for points of the mirror off the axis, which correction is in the nature of a coma correction, may be approximately and simply arrived at by correcting the lens for spherical aberration in a particular fashion, namely such that the axial point of the slit is one of the conjugate points for which the said lens is made to have a spherical correction. In other words, in Fig. 7, the lens 45, 46, when designed to be spherically corrected for the conjugate focal point, on the axes at 10 (to which a point beyond or to the other side of the mirror is conjugate), will be substantially corrected for coma along oblique bundles passing through the system. In other words under such conditions the rays 71, 72 will focus approximately in the surface 50 and can be more accurately brought to do so by slight modifications of the spherical correction already made.

That such correction is necessary is evidenced by the fact that if it is not made, and indeed often when cylindrical lenses of closely similar structure are used, the rays 71, 72 representing marginal oblique bundles, will not even approximately focus on the surface 50 and may focus away from it an appreciable proportion of the total focal distance.

This will be better understood by reference to Fig. 8 in which the nature of this correction is made more general by increasing the size of the slit (as may under certain circumstances be desirable for other reasons). In Fig. 8, 5 is the mirror, 55, 57 the positive cylindrical lens 40", 42' the negative cylindrical lens, existing in this example as a part of the spherical lens 58, or 11, which latter serves the purposes of the lens 11 of Fig. 1, and 10' a large slit opening whose margin 61 is projected from the margin of the lens 55, 57 in the axial point 66. At 63, and 62 are shown the focal surfaces corresponding respectively to the focal surfaces 51 and 50 of Fig. 7.

The ray 69 which projects from the point 66 the margin of the slit 61 in the lens 55, 57 at the point 68, likewise defines a marginal point of the mirror image at 70. Hence the ray 67, which is an optical continuation of the ray 69, passes through the marginal point 5 of the mirror, which point is conjugate to the point 70 and at a distance from the axis proportionate to that of the point 70 from the axis, consideration being taken of the ratio of the sizes of the mirror and its image. The ray 67, passing through 68 and 5, by its extension cuts the axis in a point 56, conjugate to 66. The necessary correction for the lens 55, 57 in order to approximately free it from coma, is then to correct it for spherical aberration for these two points 56 and 66, points which are conjugate axial points and one of which is the axial crossing point of the ray for which coma is to be corrected, and which in the example is the marginal ray from a marginal mirror point. In other words the correction then obtained is for a slit or stop off the axis, at the intersection of the ray 69 with the slit plane.

Where the slit is small the point 66 substantially coincides with the slit margin 61. That the above is a sufficient first approximation to a satisfactory coma correction follows from the fact that it is possible to show by plane geometry that the imagery of the mirror is linearly distortionless and formed by homocentric bundles provided the lens is free of spherical aberration for conjugate points one of which is determined by a ray from the margin of the lens as utilized to the margin of the mirror and thence continued to the axis.

If the lens 55, 57 be of large opening, say $f/2$, and also if the slit at 61 be relatively large, then it is impossible with a simple doublet construction to get a spherical or coma correction which very closely approximates the ideal for the entire opening or for the entire slit opening, that is for the entire bundle traversing the slit to form an image of any one mirror point. In seeking to obtain such a general correction for a large opening of the lens one encounters the usual difficulties met with in correcting doublets having such large openings. In addition if the slit be large, then for any one mirror point the spherical correction above described is in reality, in the general case, a correction for only one point of the mirror and slit opening, and for the entire correction it is necessary to have a spherical correction for a continuum of pairs of mirror points and slit points. Thus in order that the correction exist for all mirror points in respect to all slit points it is necessary that the lens have a spherical correction for the continuum of axial conjugate points lying between the extreme point 66 and the slit 61. A large aperture lens of no more complicated structure than doublet construction cannot be made more than approximately, even if substantially corrected for such a continuum. It is therefore necessary to choose the most satisfactory average correction for all rays. This in practice may mean a nearly perfect correction for the half way point of mirror (half way to margin) and some over-correction at the margin; the focal point 73 in Fig. 7 too far to the right. Or the focal point 73 for the half mirror height can be too short, too far to the left, and the marginal mirror image point in about the most suitable position, that is on the surface 50. Or the half way point of the slit, half way to the margin, may be substantially corrected for the entire image area and the margin of the slit slightly over-corrected and vice versa. Thus where the slit opening is large all such marginal image points as imaged through various portions of the slit by various pencils cannot be in the same place but will show some spread, which spread, however, can be minimized by suitable design of the lens. The pencils most effective in the complete optical imagery must be those for which the best correction is made.

In Fig. 8, by way of illustrative example the cylindrical doublet 55, 57 might have construction characteristics as follows:

$r_1 = +4.094$ mm.
$d_1 = .372$ mm. Heavy flint
$r_2 = +1.913$ mm.
$d_2 = .744$ mm. Crown flint
$r_3 = -6.774$ mm.

Heavy flint is $n_F = 1.66122$ $\nu = 33.9$
Crown-flint is $n_F = 1.52110$ $\nu = 54.7$ It would then be corrected for a central slit 61 of small dimensions, so that the correction is designed to hold particularly for one pencil for each mirror point, and for a continuum of such points up to a mirror size representing a semi-angular opening for the slit beam whose tangent is $\frac{1}{10}$.

The following lens is designed to be corrected for the two marginal points of a slit of dimension or opening ⅓ the size or length of the utilized mirror and for a semi-angular opening of the beam of $\frac{1}{10}$. The correction for intermediate slit points and for slit points up to twice the designated slit opening is also quite good.

$r_1 = +4.388$ mm.
$d_1 = .399$ mm. Heavy flint
$r_2 = +2.034$ mm.
$d_2 = .798$ mm. Zinc-crown
$r_3 = -7.260$ mm.

Heavy flint is $n_F = 1.66122$ $\nu = 33.9$
Zinc-crown is $n_F = 1.54046$ $\nu = 55.4$ These two lenses have as conjugate focal distances 12.5 m/m to the mirror and 12.25 m/m to the mirror image. They are both partially color corrected so as to make the system 55, 57—42' achromatic for the F and g lines as above described. They are spaced 7.5 m/m optical distance from their second principal point to the negative cylindrical surface 42'. The latter surface has for the "F" ray a conjugate focal distance, with respect to the mirror, of 4.75 m/m and for the "g" ray of 4.69 m/m. It has a radius of 2.17 m/m; index for the d ray of 1.5606 and Abbe number 61.2.

I have found that to secure such a coma or spherical correction for the positive cylindrical element it is desirable to use, in a cemented doublet, a fairly heavy flint of large index and relatively small Abbe number, and to associate with it for the positive element of the doublet, a crown of not too large Abbe number, the difference between the two Abbe numbers being about 21 to 23 units and between the two indexes about 0.12 to 0.14. The desirable form for the doublet is one in which the flint is a meniscus lens with both surfaces convex towards the mirror. An increase in the index difference of .02 is about equivalent, in its effect, to a unit decrease in the Abbe number difference. Both differences may, therefore, be varied in the same sense in the above proportions, while maintaining a substantially satisfactory correction. It is not intended to limit the invention to a spherical correction obtained with such glass combinations, other pairs of glasses and arrangements known in the art as suitable for obtaining spherical correction may likewise be used to provide the structural relationship between the parts of the light flux system as outlined in the above description of the invention.

In Fig. 8 is further shown a modification of the invention in which the cylindrical surface 42' which constitutes the negative element of the anamorphosing light flux system is formed on a plane surface of a spherical lens 58, 59, or 11' the plane surface being on the face facing the slit. The lens 58, 59, as distinguished from the cylindrical element formed on its plane surface, may be corrected for color and, if necessary, for spherical aberration in the conventional manner, thus increasing the homocentricity of the light in the region to the other side of the slit, that is between the slit and the objective imaging the slit on the film. For instance this might be very desirable where optical devices which should be traversed by parallel beams of light are placed on this side of the slit.

The element with the flat surface should be, as above indicated, a crown of relatively large Abbe number. For if this element, 59, is a crown of relatively large Abbe number, this facilitates the color correction of the light flux anamorphoser 55, 57—42'. The flint element is then a meniscus with both surfaces convex toward the mirror and should preferably be of larger index than the crown in order that a suitable spherical correction be obtainable.

The following are the data for a suitable spherical doublet of this character to be associated with the cylindrical lens 55, 57, the spherical lens having, in this example, the mirror 5 as its principal focal point. The opening is 6.2 m/m or approximately $f/3$.

$R_1$=infinity
$t_1$=1.5065 mm. Heavy crown
$R_2$=−4.3404 mm.
$t_2$=.7533 mm. Barium heavy flint
$R_3$=−8.8585 mm.
Heavy crown $n_F$=1.56696  $\nu$=61.2
Barium heavy flint $n_F$=1.66329  $\nu$=38.3

It is somewhat under-corrected at the margin for spherical aberration but is particularly designed to have a good spherical correction for that portion of the lens in the zone from a half to a full opening, and for two colors, the F and $g$ lines.

The following doublet is a lens of similar opening and relationships to the system, with chromatic and spherical correction made across the entire opening.

$R_1$=infinity
$t_1$=1.431 mm. Barium flint.
$R_2$=−4.1495 mm.
$t_2$=.7154 mm. Heavy flint.
$R_3$=−8.4135 mm.
Barium flint $n_F$=1.57773  $\nu$=49.5
Heavy flint $n_F$=1.70392  $\nu$=31.2

This lens has a higher index difference than the previous one, and therefore also a higher Abbe number ratio. The Abbe number of the positive element is small and therefore gives more color aberration in the negative cylindrical element, to be corrected for by under-correction of the positive cylindrical doublet. A similar spherical correction might have been obtained with suitable choice of glasses of larger absolute Abbe number value.

In both the above illustrative examples of the spherical lens it is made to have the mirror or light source at its principal focus. It might on the other hand have been desirable to make the mirror conjugate with respect to the lens to the stop of the objective imaging the slit on the film as in Figure 1.

In both of the above illustrative examples of spherical lenses at the slit, in order to have the element with the flat surface facing the slit have the larger Abbe number, it was necessary, in order to obtain a spherical and color correction, to have it also the positive element of the cemented doublet and therefore the negative element, of necessity, in such a cemented doublet must then have both of its surfaces convex toward the exterior of the doublet, that is toward the mirror.

In Fig. 9 there is shown a conventional arrangement of a spherically and chromatically corrected cemented doublet, in this instance a cylindrical doublet, in which the flat surface is formed on the lens of smaller Abbe number, namely, the negative element.

In certain circumstances it may be desirable to have the lens 11 of Fig. 7, or 11 of Fig. 1, image in one plane only that is in a plane parallel to the slit. In other words, it may be a cylindrical field lens having the form shown in Fig. 9 where 78, 79 is a cylindrical doublet 11' with positive element 78 and negative element 79, both with axis perpendicular to the slit 10. This doublet, as also in Fig. 8, is shown with a plane surface adjacent to the slit on which is formed a cylindrical element 42 parallel to the slit and which element constitutes the negative element of the anamorphosing light flux system as herein described.

A field lens 78, 79 as shown in Fig. 9 may be substituted for the lens 11 of Fig. 1 and may be of such focal length, in the plane parallel to the slit, as to image the mirror, as at 5 in Fig. 6, in the objective aperture 12'. If such is the case then the anamorphosing element 40, 42 of Fig. 6 should be designed to image the mirror in the objective aperture 12 and not at 5 as previously described. With such a design and the use of cylindrical systems both for the light flux anamorphoser and for the mirror imagery, the imagery in the region between the slit and the objective remains homocentric as was also the case with the design previously described. In order that the mirror 5 be imaged, in the active plane of the lens 40, in the objective aperture 12' rather than in the mirror 5', it is necessary that the cylindrical element 42 have as two conjugate foci the intersections with its axis of the planes 41 and 12'. In other words its focal length is somewhat different than that previously described. It is longer instead of shorter than the distance 42 to 41.

A solution of the problem has been given in which the imagery between the slit and the objective opening is not only homocentric but consists of pencils of parallel light. Usually such collimated light is reimaged in an objective serving the function of the objective 13 of Fig. 1. Such collimation may also be accomplished with the design of Fig. 9 by making the cylindrical system 78, 79 spherically corrected with its principal focus in the mirror. Such an arrangement collimates the light in the plane parallel to the slit. In order to accomplish the same result in the plane perpendicular to the slit it would then be necessary to make the light flux anamorphosing system as at 40, 42 in Fig. 6, image the mirror at infinity. In other words, the negative cylindrical element 42 would have its principal focus in the plane 41.

It should be pointed out that this imagery by crossed cylinders does not in general give satisfactory imagery of a plane object. In this instance however satisfactory imagery is obtained because of the peculiar stop conditions obtaining in the system, namely, the narrow width of the slit through which light has to pass and its parallelism to one of the principal axis of the crossed cylindrical system.

In both of the above mentioned solutions, namely, where the lens 42 has a longer focal length than the distance from 37 to 41 and where it has a focal length equal to this distance, the color correction of the system 40, 42 can be made in the same fashion as previously described. Likewise the correction for coma off the axis of the positive element 40 can be made in substantially the same fashion as previously described. In these two solutions however there is no other imagery in its active plane than that of the flux anamorphosing system and therefore there is no curvature of the imagery in this plane, as due to other elements, to be corrected for. The positive cylindrical lens 45, 46 of Fig. 7 should therefore then be corrected for coma so as to have its off-the-axis imagery on the image surface 51 of the lens 42 and not at some other place as previously described. The first approximation of such a correction is obtained, as heretofore, by the spherical correction previously described. A slight modification of that correction will produce the desired correction.

The foregoing description is illustrative but is not intended as an exhaustive treatise on the possibilities of the invention nor in particular of the definitive solutions thereof.

I claim:

1. A light flux anamorphosing system comprising a source of light, a light gate having an opening which is restricted in one meridian, and a positive and a negative cylindrical lens each with its axis perpendicular to said meridian, all these elements situated symmetrically on the axis of the system, in which the positive lens is positioned between the light source and the gate and has a conjugate focal length with respect to the light source greater than the distance of the lens from the gate, the negative lens being positioned to the other side of the positive lens from the light source and near the light gate and having a focal length such that the conjugate focal points of the positive cylindrical lens first mentioned are also substantially conjugate focal points of the negative cylindrical lens.

2. In a light flux system, the combination with two light gates on the axis of the system, each of said gates having an opening which is restricted in one and the same meridian, of means for increasing the light flux through the openings, comprising a positive and a negative cylindrical lens, each with its axis perpendicular to said meridian, the positive lens being positioned between the two gates and imaging the axial point of one of the gates at an axial point on the opposite side of the positive lens from the said gate and at a greater distance from the positive lens than the other or second gate, the negative lens being situated near the second gate and being of such focal length as to image the last mentioned axial point at the axial point of the first mentioned gate whereby the paraxial convergence points of the system are not appreciably displaced.

3. A light flux system as defined in claim 2, in which the positive cylindrical lens is compound and has radii, thicknesses, indices and dispersions of its glasses so chosen that the lens is corrected for spherical aberration for a pair of conjugate focal points of which one is the axial point of the opening of the light gate nearest the negative cylindrical lens.

4. A light flux system as defined in claim 2, in which the positive cylindrical lens is compound and has radii, thicknesses, indices and dispersions of its glasses so chosen that the lens is corrected for spherical aberration for a pair of conjugate focal points of which one is located approximately at the intersection with the axis of a straight line drawn in the plane of the said meridian from the marginal point of the opening in the second gate to the opposite marginal point of the collinear image of the opening of the first gate by the positive cylindrical lens.

5. A light flux system as defined in claim 2, including spherical elements having positive spherical aberration, in which the positive cylindrical lens is compound and has together with the negative cylindrical lens, radii, indices and dispersions of its glasses so chosen that, as compared with the paraxial imagery, the corresponding ab-axial imagery has increased negative convergence, thus in part neutralizing the positive spherical aberration of the spherical elements of the system.

6. A light flux system as defined in claim 2, in which the positive cylindrical lens is compound and has radii, indices and dispersions of its glasses so chosen that the lens is substantially corrected for spherical aberration for a pair of conjugate focal points of which the one on the side of the last mentioned axial point is at a less distance from the lens than said last mentioned axial point.

7. In a light flux system, the combination with a light source and a light gate having an opening which is restricted in one meridian, of a positive and a negative cylindrical lens, each with its axis perpendicular to said meridian, all arranged symmetrically on an axis, the positive lens being positioned between the light source and the gate and imaging the axial point of the light source at a point at a substantial distance from the gate and beyond the gate from the positive lens, thereby to restrict the utilized portion of the light source in the said meridian, and the negative lens comprising a single cylindrical refracting surface and positioned near the gate and being of such focal length as to image the image of the light source by the positive lens elsewhere in the system, thereby to make the paraxial imagery of the system homocentric, the positive lens being compound and having radii, thicknesses, indices and dispersions of its glasses as chosen as to partially achromatize it for its said conjugate focal points sufficiently to make the chromatism of the negative lens approximately neutralize the residual chromatism of the positive lens, thus achromatizing the cylindrical lens system as a whole.

8. A light flux system as defined in claim 7, in which for each color for which achromatization is accomplished the axial point of the light source and a point of the axis to the other side of the gate from the positive cylindrical lens are conjugate points with respect to both the positive and the negative cylindrical lens.

9. A light flux system as defined in claim 7, in which, for each color for which achromatization is accomplished, the point of the axis to the other side of the gate from the positive cylindrical lens which is conjugate to the axial point of the light source is also a principal focal point of the negative cylindrical lens.

10. A light flux system as defined in claim 7, including a positive cylindrical lens placed adjacent to the negative cylindrical lens and with its principal focal point in the light source and its axis oriented perpendicular to that of the negative cylindrical lens, in which, for each color for which achromatization of the first mentioned positive and negative cylindrical lenses is accomplished, the point of the axis to the other side of the gate from the first mentioned positive cylindrical lens which is conjugate to the axial point of the light source is also a principal focal point of the negative cylindrical lens, wherein the last mentioned positive cylindrical lens has a flat surface on which is formed the negative cylindrical lens.

11. A light flux system as defined in claim 7, including a positive spherical lens placed adjacent to the negative cylindrical lens and of such focal length as to form a real image of the light source, in which, for each color for which achromatization of the positive and negative cylindrical lenses is accomplished, the axial point of the light source and a point of the axis to the other side of the gate from the positive cylindrical lens are conjugate points with respect to both the positive and the negative cylindrical lens, wherein the spherical lens has a flat surface on which the negative cylindrical lens is formed.

12. A light flux system as defined in claim 7, including a positive spherical lens placed adjacent to the negative cylindrical lens and of such focal length as to form a real image of the light source, in which, for each color for which achromatization of the positive and negative cylindrical lenses is accomplished, the axial point of the light source and a point of the axis to the other side of the gate from the positive cylindrical lens are conjugate points with respect to both the positive and the negative cylindrical lens, wherein the spherical lens has a flat surface on which the negative cylindrical lens is formed, and wherein the positive cylindrical lens is approximately corrected for spherical aberration for a pair of conjugate focal points substantially different from the first mentioned conjugate focal points, the one on the same side of the positive cylindrical lens as the light gate being nearer the gate than the corresponding first mentioned point conjugate to the light source.

13. A light flux system as defined in claim 7, including a positive achromatized spherical doublet placed adjacent to the negative cylindrical lens and of such focal length as to form a real image of the light source, in which, for each color for which achromatization of the positive and negative cylindrical lenses is accomplished, the axial point of the light source and a point of the axis to the other side of the gate from the positive cylindrical lens are conjugate points with respect to both the positive and the negative cylindrical lens, wherein the positive spherical doublet has a flat surface on which the negative cylindrical lens is formed, the flat surface of the doublet being on the glass of greater Abbe number and the other glass having both surfaces convex towards the light source.

14. A light flux system as defined in claim 7, including a positive spherical lens placed adjacent to the negative cylindrical lens and of such focal length as to form a real image of the light source, in which, for each color for which achromatization of the positive and negative cylindrical lenses is accomplished, the axial point of the light source and a point of the axis to the other side of the gate from the positive cylindrical lens are conjugate points with respect to both the positive and the negative cylindrical lens, wherein the spherical lens has a flat surface on which the negative cylindrical lens is formed, and wherein the positive cylindrical lens is approximately corrected for spherical aberration for a pair of conjugate focal points substantially different from the first mentioned conjugate focal points, the one on the same side of the positive lens as the light gate being nearer the gate than the corresponding first mentioned point conjugate to the light source, in which the positive cylindrical lens is a cemented doublet with the glass of smaller Abbe number having both surfaces convex toward the light source.

15. A light flux system as defined in claim 7, in which, for each color for which achromatization of the positive and negative cylindrical lenses is accomplished, the axial point of the light source and a point of the axis to the other side of the gate from the positive cylindrical lens are conjugate points with respect to both the positive and the negative cylindrical lens, and wherein the positive cylindrical lens is approximately corrected for spherical aberration for a pair of conjugate focal points substantially different from the first mentioned conjugate focal points, the one on the same side of the positive lens as the light gate being nearer the gate than the corresponding first mentioned point conjugate to the light source, in which the positive cylindrical lens is a cemented doublet with the glass of smaller Abbe number having the greater index and both surfaces convex toward the light source, the Abbe numbers of the two glasses differing by approximately 21 to 23 units and the two indices of refractions differing by approximately 0.12 to 0.14 plus the algebraic product of 0.02 and the number obtained by subtracting 22 from the Abbe number difference.

16. A light flux system as defined in claim 7, including a positive spherical lens placed adjacent to the negative cylindrical lens and of such focal length as to form a real image of the light source, in which, for each color for which achromatization of the positive and negative cylindrical lenses is accomplished, the axial point of the light source and a point of the axis to the other side of the gate from the positive cylindrical lens are conjugate points with respect to both the positive and the negative cylindrical lens, the tangential image surface of the spherical lens, lying in its significant portion, towards the lens side of its principal focal plane, the positive and negative cylindrical lenses constituting a light flux anamorphosing system having an oblique tangential imagery with a negative convergence effect, the degree of which is such as to reduce the deviation of the tangential image surface of the spherical lens from its principal focal plane.

17. A light flux system as defined in claim 7, including a positive spherical lens placed adjacent to the negative cylindrical lens and of such focal length as to form a real image of the light source, in which, for each color for which achromatization of the positive and negative cylindrical lenses is accomplished, the axial point of the light source and a point of the axis to the other side of the gate from the positive cylindrical lens are conjugate points with respect to both the positive and the negative cylindrical lens.

18. A light flux system as defined in claim 7, in which, for each color for which achromatization of the positive and negative cylindrical lenses is accomplished, the axial point of the light source and a point of the axis to the other side of the gate from the positive cylindrical lens are conjugate points with respect to both the positive and the negative cylindrical lens, and wherein the positive cylindrical lens is approximately corrected for spherical aberration for a pair of conjugate focal points substantially different from the first mentioned conjugate focal points, the one on the same side of the positive lens as the light gate being nearer the gate than the corresponding first mentioned point conjugate to the light source.

19. A light flux system in axial alignment comprising a source of light, a light gate having an opening which is restricted in one meridian, the restricted dimension of the gate being less than one tenth of a millimeter, and a positive cylindrical lens with its axis perpendicular to the said meridian, the positive cylindrical lens being positioned between the light source and the gate and at a distance from the light source greater than its principal focal length, thereby to image said light source in a conjugate plane situated to its opposite side and beyond the gate, the light gate thus being positioned between said positive lens and said conjugate plane and also being at least one millimeter from the latter, the light gate thus reimaging, in the manner of a pinhole objective, the conjugate plane in the light source, together with a positive field lens positioned at the gate and having its conjugate foci lying approximately in the light source and in the entrance pupil of a positive spherical lens system placed beyond both the gate and the above mentioned conjugate plane, the said spherical lens system in turn imaging the gate on a film placed beyond the said spherical lens system.

HARRY SIDNEY NEWCOMER.